United States Patent
Porcino

(10) Patent No.: US 8,698,898 B2
(45) Date of Patent: Apr. 15, 2014

(54) CONTROLLING ROBOTIC MOTION OF CAMERA

(75) Inventor: Domenico Porcino, San Rafael, CA (US)

(73) Assignee: Lucasfilm Entertainment Company Ltd., San Francisco, CA (US)

(*) Notice: Subject to any disclaimer, the term of this patent is extended or adjusted under 35 U.S.C. 154(b) by 1141 days.

(21) Appl. No.: 12/333,169

(22) Filed: Dec. 11, 2008

(65) Prior Publication Data

US 2010/0149337 A1    Jun. 17, 2010

(51) Int. Cl.
H04N 7/18    (2006.01)

(52) U.S. Cl.
USPC .......................................................... 348/159

(58) Field of Classification Search
USPC ................... 348/14.03, 14.04, 116, 159, 169, 348/211.99
See application file for complete search history.

(56) References Cited

U.S. PATENT DOCUMENTS

| | | | |
|---|---|---|---|
| 3,916,094 A | 10/1975 | Marrone | |
| 5,697,757 A * | 12/1997 | Lindsay | 414/744.6 |
| 6,517,207 B2 | 2/2003 | Chapman | |
| 7,403,220 B2 | 7/2008 | MacIntosh et al. | |
| 7,433,760 B2 * | 10/2008 | Alvarez et al. | 700/251 |
| 7,463,304 B2 | 12/2008 | Murray | |
| 7,625,286 B2 | 12/2009 | Hamada | |
| 7,628,700 B2 | 12/2009 | Baseflug et al. | |
| 7,769,492 B2 * | 8/2010 | Wang et al. | 700/257 |
| 8,079,950 B2 * | 12/2011 | Stern et al. | 600/109 |
| 8,155,479 B2 * | 4/2012 | Hoffman et al. | 382/276 |
| 8,413,752 B2 * | 4/2013 | Page et al. | 180/68.5 |
| 2003/0025802 A1 * | 2/2003 | Mayer et al. | 348/211.99 |
| 2004/0006424 A1 * | 1/2004 | Joyce et al. | 701/207 |
| 2005/0018053 A1 | 1/2005 | Suga et al. | |
| 2005/0036036 A1 | 2/2005 | Stevenson et al. | |
| 2005/0186884 A1 | 8/2005 | Evans | |
| 2006/0038890 A1 * | 2/2006 | MacIntosh et al. | 348/211.99 |
| 2006/0090022 A1 | 4/2006 | Flynn et al. | |
| 2006/0100642 A1 * | 5/2006 | Yang et al. | 606/130 |
| 2006/0170768 A1 * | 8/2006 | Riley | 348/143 |
| 2006/0196301 A1 * | 9/2006 | Oleynikov et al. | 74/490.03 |
| 2006/0282873 A1 | 12/2006 | Zalewski et al. | |
| 2007/0030349 A1 * | 2/2007 | Riley | 348/143 |
| 2007/0106307 A1 * | 5/2007 | Bodduluri et al. | 606/133 |

(Continued)

FOREIGN PATENT DOCUMENTS

| | | |
|---|---|---|
| GB | 2442602 A | 9/2008 |
| JP | 2002307337 A | 10/2002 |
| JP | 2004225724 A | 8/2004 |

OTHER PUBLICATIONS

Ashcraft, "A New Era of Game Broadcasting", Feb. 3, 2006, Downloaded from the internet at: http://kotaku.com/152501/a-new-era-of-game-broadcasting on Jul. 21, 2011, 2 pages.

(Continued)

Primary Examiner — Sargon Nano
(74) Attorney, Agent, or Firm — Kilpatrick Townsend & Stockton LLP

(57) ABSTRACT

Among other disclosed subject matter, a system includes a first camera generating a live image of a scene, the first camera configured for being placed in a plurality of locations by robotic motion. The system includes a handheld device that includes a display device for continuously presenting the live image, wherein movement of the handheld device causes the handheld device to generate an output that controls the robotic motion.

25 Claims, 5 Drawing Sheets

(56) References Cited

U.S. PATENT DOCUMENTS

| | | | |
|---|---|---|---|
| 2007/0174774 | A1 | 7/2007 | Lerman |
| 2008/0015017 | A1 | 1/2008 | Ashida et al. |
| 2008/0058835 | A1* | 3/2008 | Farritor et al. ............... 606/130 |
| 2008/0312770 | A1* | 12/2008 | Alvarez et al. ................ 700/251 |
| 2008/0319252 | A1* | 12/2008 | Chapman et al. .............. 600/27 |
| 2009/0002365 | A1 | 1/2009 | Kurabayashi |
| 2009/0017911 | A1 | 1/2009 | Miyazaki |
| 2009/0069084 | A1 | 3/2009 | Reece et al. |
| 2009/0080611 | A1* | 3/2009 | Ganz et al. ...................... 378/73 |
| 2009/0089157 | A1 | 4/2009 | Narayanan |
| 2009/0102841 | A1 | 4/2009 | Clavadetscher |
| 2009/0102861 | A1 | 4/2009 | Turcotte et al. |
| 2009/0248036 | A1* | 10/2009 | Hoffman et al. .............. 606/130 |
| 2009/0284553 | A1 | 11/2009 | Seydoux |
| 2009/0309986 | A1* | 12/2009 | Mayer ...................... 348/208.99 |
| 2010/0026809 | A1 | 2/2010 | Curry |
| 2010/0062817 | A1 | 3/2010 | Seydoux |
| 2010/0208033 | A1 | 8/2010 | Edge et al. |
| 2012/0109377 | A1* | 5/2012 | Stern et al. .................... 700/259 |

OTHER PUBLICATIONS

Digi-Lab "Voodoo Camera Tracker: A Tool for the Integration of Virtual and Real Scenes", Aug. 31, 2010, downloaded from the internet at: http://www.digilab.uni-hannover.de/docs/manual.html on Jul. 21, 2011, 18 pages.

Ditzian, "Exclusive: Robert Zemeckis Indicates He'll Use Performance-Capture and 3-D in 'Roger Rabbit' Sequel", Nov. 3, 2009, downloaded from the internet at http://moviesblog.mtv.com/2009/11/03/exciusive-robert-zemeckis-indicates-hell-use-performance-capture-and-3-d-in-roger-rabbit-sequel/ on Jul. 21, 2011, 3 pages.

Even, "All These Worlds are Yours: Leslie Ekker on VFX for '2010' the Movie, Not the Year" Jan. 12, 2010, downloaded from the internet at: http://idesignyoureyes.com/2010/01/page/2/ on Jul. 21, 2011, 7 pages.

Intersense, Inc. "Intersense, Inc. Unveils Proof-of-Concept VCam Lite Handheld Virtual Camera System at SIGGRAPH 2009", Aug. 4, 2009, downloaded from the internet at: http://imagingreporter.com/2009/08/intersense-inc-unveils-proof-of-concept-vcam-lite-handheld-virtual-camera-system-at-siggraph-2009/ on Jul. 21, 2011, 2 pages.

Isilon Systems LLC "Lightstorm Entertainment Uses Isilon IQ to Power Production of "Avatar"", Dec. 18, 2009, downloaded from the internet at http://www.isilon.com/press-release/lightstorm-entertainment-uses-isilon-iq-power-production-avatar on Jul. 21, 2011, 1 page.

Kuang, "Motion-Capture Invention Promises WETA Digital Effects on a YouTube Budget" Apr. 29, 2009, downloaded from the internet at: http://www.fastcompany.com/blog/cliff-kuang/design-innovation/new-invention-slashes-cost-motion-capture-99 on Jul. 21, 2011, 3 pages.

Six Apart, Ltd., "New Technology in AVATAR—Performance Capture, Fusion Camera System, and Simul-Cam" May 30, 2010, downloaded from the internet at: http://avatarblog.typepad.com/avatar-blog/2010/05/new-technology-in-avatar-performance-capture-fusion-camera-system-and-simulcam.html on Jul. 21, 2011, 2 pages.

Suanez, "Wacom Cintiq Reviewed in Deep", Jun. 18, 2008, downloaded from the internet at: http://www.sosfactory.com/blog/articles/wacom-cintiq-review/ on Jul. 21, 2011, 18 pages.

International Search Report and Written Opinion for Application No. GB0921667.2, dated Feb. 11, 2010, 3 pages.

"Fiduciary marker" Wikipedia, 2008 [Online] [Retrieved on Aug. 27, 2009] Retrieved from the Internet: http://en.wikipedia.org/wiki/Fiduciary_marker.

"Forward kinematics" Bridgeport, 1997 [Online] [Retrieved on Aug. 27, 2009] Retrieved from the Internet: http://www.1bpt.bridgeport.edu/sed/risc/html/sim/node6.html.

"Technocrane 20" Panaviaion, 2004 [Online] [Retrieved on Aug. 27, 2009] Retrieved from the Internet: http://www.panavision.com/product_detail.php?cat=103&id=110&imgid=158.

Parrot Ar.Drone "How Does it Work?" Retrieved from the Internet: http://ardrone.parrot.com/parrot-ar-drone/usa/how-does-it-work (2012) 1 page.

Office Action for GB Application No. GB0921667.2 mailed Jul. 19, 2013, 3 pages.

AU application No. 2009248424 dated Jan. 25, 2013, 3 pages.

* cited by examiner

CONTROLLING ROBOTIC MOTION OF CAMERA

TECHNICAL FIELD

This document relates to controlling robotic motion of a camera.

BACKGROUND

Digital or film cameras can be used for the production of motion pictures. Sometimes, these cameras or support systems for the cameras are robotically operated, generally by a technician under the direction of a director of photography. Computer-based systems employing graphics engines can be used for film or video production. Virtual settings or characters are sometimes created by designers and animators for inclusion in film or video with real-world settings or characters.

SUMMARY

The invention relates to controlling robotic motion of a camera.

In a first aspect, a system includes a first camera generating a live image of a scene, the first camera configured for being placed in a plurality of locations by robotic motion. The system includes a handheld device that includes a display device for continuously presenting the live image, wherein movement of the handheld device causes the handheld device to generate an output that controls the robotic motion.

Implementations can include any or all of the following features. The handheld device can include a tablet device having a generally flat configuration with the display device located on a main face of the tablet device. The handheld device can include an inertia sensor and the output controlling the robotic motion of the first camera can be generated using the inertia sensor. The handheld device can include an optical sensor and the output controlling the robotic motion of the first camera can be generated using the optical sensor. The handheld device can include a magnetic sensor and the output controlling the robotic motion of the first camera can be generated using the magnetic sensor. The system can further include a plurality of second cameras mounted in a fixed arrangement around an area where the handheld device is to be used, the second cameras registering the movement of the handheld device, wherein the output controlling the robotic motion of the first camera is generated using the second cameras. The system can further include an automated crane on which the first camera is mounted, the automated crane configured for receiving the output and placing the first camera in any of the plurality of locations by the robotic motion. The first camera can be associated with a first set where the scene takes place, the first camera can generate the live image from the first set, and the system can further include a second camera associated with a second set, the second camera configured to generate another live image from the second set; wherein the output that controls the robotic motion of the first camera can also control the second camera. The second set can be a virtual set generated by a computer and the second camera can be a virtual camera generated by the computer.

In a second aspect, a computer-implemented method for controlling a camera includes receiving location information regarding a handheld device carried by an operator, the handheld device including a display device for continuously presenting a live image from a first camera configured for being placed in a plurality of locations by robotic motion. The method includes calculating a new location for the first camera using the location information. The method includes placing the first camera in the new location by the robotic motion while presenting the live image on the display device.

Implementations can include any or all of the following features. The method can further include identifying an initial location of the first camera; and calculating a path for the first camera from the initial location to the new location, the first camera to traverse the path by the robotic motion. The method can further include identifying at least one obstruction between the initial location and the new location; and taking the obstruction into account in calculating the path so that the obstruction does not interfere with the first camera. The first camera can be associated with a first set and the obstruction can be identified using a model of the first set. Calculating the path can include determining a movement of the handheld device based on the location information; scaling the movement into a scaled movement according to at least one predefined parameter; and determining the path so that the first camera undergoes the scaled movement. The method can further include causing the first camera to undergo a predefined movement specified based on path information; identifying an aspect of the predefined movement to be modified using the handheld device; modifying a parameter using the location information, the parameter corresponding to the aspect of the predefined movement; and recording the modified parameter in association with the path information such that the modified parameter is taken into account in a subsequent use of the path information. The method can further include registering an output from the handheld device generated by the operator moving the handheld device before the first camera undergoes the predefined movement, the operator moving the handheld device to specify the predefined movement; and recording the path information based on the registered output before the first camera undergoes the predefined movement. The method can further include receiving the path information before the first camera undergoes the predefined movement, the path information received from an application program configured for specifying robotic camera control. The first camera can be associated with a first set and generate the live image from the first set, and the method can further include associating a second camera with a second set, the second camera configured to generate another live image from the second set; placing the second camera in another location based on the location information, while presenting at least portions of the live image and the other live image on the display device. The second set can be a virtual set generated by a computer and the second camera is a virtual camera generated by the computer.

In a third aspect, a system includes a camera generating a live image of a scene. The system includes an automated crane on which the camera is mounted, the camera configured for being placed in a plurality of locations by robotic motion using the automated crane. The system includes a handheld device that includes a display device for continuously presenting the live image. The system includes a position detector generating an output that controls the robotic motion based on movement of the handheld device, wherein the robotic motion causes the camera to emulate the movement of the handheld device while the live image is presented on the display device.

Implementations can provide any, all or none of the following advantages. Improved control of camera robotic motion can be provided. An improved user interface to a camera motion control system can be provided. A handheld device that affects camera location or motion while allowing an operator to see the resulting camera output can be provided.

The details of one or more embodiments are set forth in the accompanying drawings and the description below. Other features and advantages will be apparent from the description and drawings, and from the claims.

DESCRIPTION OF DRAWINGS

Like reference symbols in the various drawings indicate like elements.

DETAILED DESCRIPTION

Figure 1:
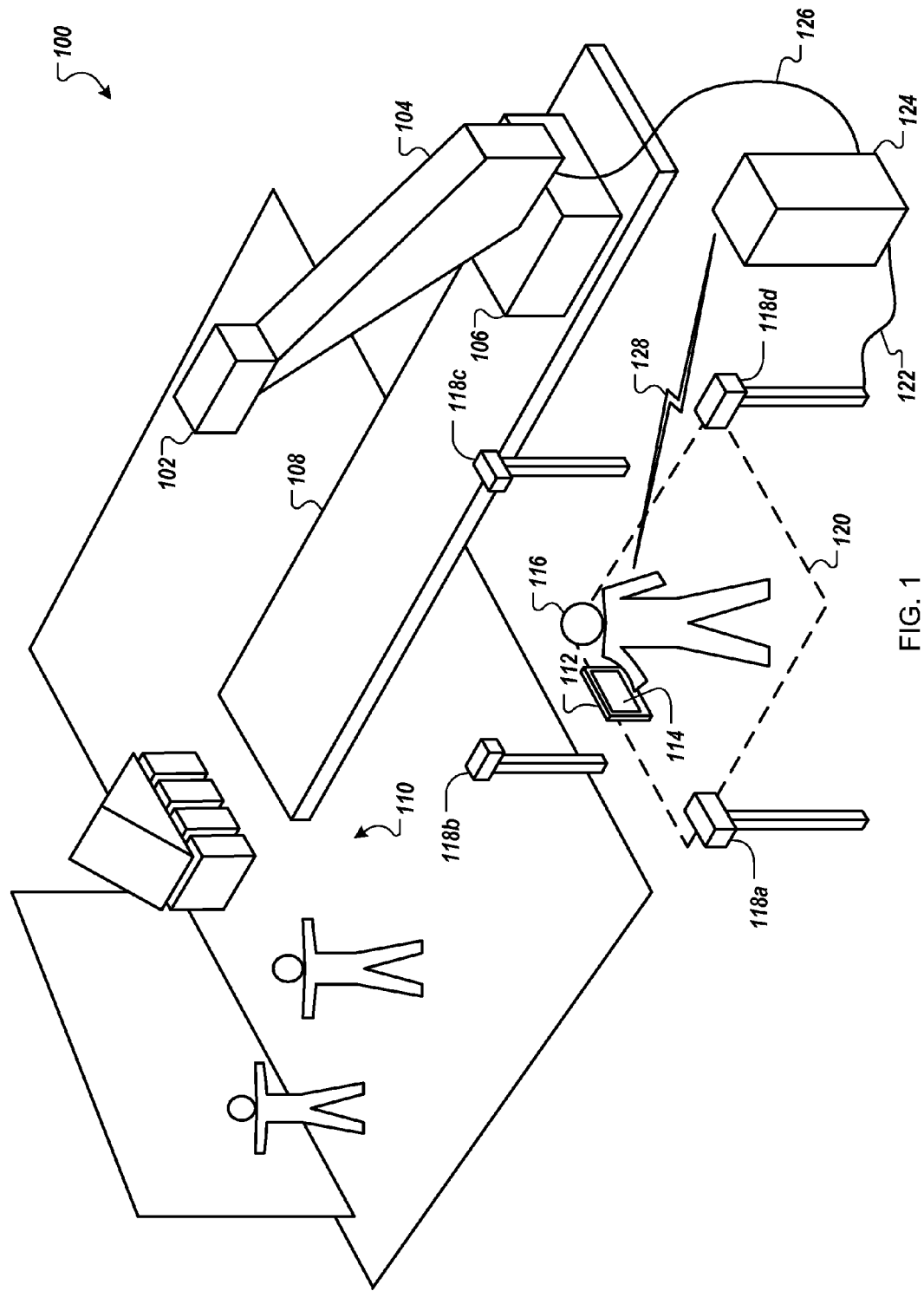
FIG. 1 shows an example system that can provide remote control to a robotic camera.

FIG. 1 is a diagram of an example system 100 for providing remote control to a robotic camera. In some implementations, the system 100 can be used for production of image contents such as video or motion pictures. Robotic safeguards can be put into place when implementing the system 100, such as mechanical guards, presence sensing devices, trip devices, emergency stop switches, work envelope limit stops, and other robotic safeguards, but these are not explicitly shown in the figure for clarity. In examples below, it will be described that an operator can control a robotically maneuvered camera while viewing essentially real time feedback of an image captured by the camera.

The system 100 in this example includes a camera 102 that can be mounted on an automated robotic crane 104. Any kind of camera can be used, such as a digital camera or a camera recording on light-sensitive photographic film, to name a few examples. Any kind of robotic crane can be used, such as a mechanized arm with one or more articulated joints and that can be controlled by electronic input, such as from a computer. In some implementations, the camera 102 and the robotic crane 104 can be positioned on a dolly 106 that can be caused to move along a dolly track 108. In some implementations, the dolly 106 can move without track, for example when surface conditions are favorable or when the dolly can otherwise be effectively controlled. The camera 102, the robotic crane 104, and the dolly 106 can be placed in any of a variety of positions relative to a scene 110 to achieve a variety of camera movements and angles, for example. In some implementations, the camera 102 can be positioned to generate a live image of the scene 110, the camera 102 configured for being placed in a plurality of locations by robotic motion.

The system 100 in this example also includes a handheld device 112 that includes a display device 114. In some implementations, the handheld device 112 can continually present a live image generated by the camera 102, and movement of the handheld device 112 can control the robotic motion of the camera 102, and/or the crane 104, and/or the dolly 106. In some implementations, the handheld device 112 can be or include a tablet device having a generally flat configuration with the display device 114 located on a main face thereof. The tablet device can include suitable components for performing its functions, such as a memory and/or hard drive for storing information such as software; a processor for executing instructions regarding the operation of the device; a driver or other component interfacing with the display device 114; and a bus or other connector by which two or more of the components can interact with each other.

The handheld device 112 can be controlled by an operator 116, such as a cinematographer, for example. In some implementations, the operator 116 can move the handheld device 112 through 3D space, thereby generating output to control the robotic motion of the camera 102 and/or the crane 104 and/or the dolly 106, while viewing essentially real time feedback including the image captured by the camera 102, for example. The visual feedback can be used by the operator 106 to improve the control of the camera 102 and/or its supporting equipment, such as to record or broadcast live action, or to record or refine camera moves, to name a few examples. In some implementations, camera settings such as focus, aperture, shutter speed, and/or zoom can be controlled in addition to camera movement, to name a few examples.

Any of multiple techniques can be used for generating the output to control the robotic motion of the camera 102 and/or the crane 104 and/or the dolly 106. Examples involving one or more sensors mounted on or around the handheld device 112 will be described below. In the present example, the system 100 includes one or more sensors 118a-d mounted in a fixed arrangement around an area 120 where the handheld device 112 is to be used. In some implementations, one or more of the sensors 118a-d can include motion-detecting cameras and can optically register the movement of the handheld device 112 and/or of the operator 116, wherein the output controlling the robotic motion of the camera 102 and/or its supporting equipment can be generated using the motion-detecting camera(s). For example, one or more motion-detecting cameras can register that the handheld device 112 is moved in a forward direction in the area 120, and this can generate an output that causes the dolly 106 and/or the robotic crane 104 to move the camera 102 generally in a forward direction with regard to the scene 110. As another example, one or more motion-detecting cameras can register that the operator 116 makes a change in relative position to the device 112 (e.g., by extending the arms holding the device), and this can generate an output that causes a change in the position of the camera 102 and/or a change in one or more camera settings (such as focus, aperture, shutter speed, and zoom). As another example, one or more of the motion-detecting cameras can register that the operator 116 makes a predetermined gesture, such as a hand gesture, for example, and this can generate an output that causes a change in the position of the camera 102 and/or a change in one or more camera settings.

In some implementations, the motion-detecting camera(s) can transmit video and/or related positional and movement information via one or more wired and/or wireless connection 122 to a computer 124. Here, the computer 124 can process video and/or related information to determine the position and the movement of the operator 116 and/or the handheld device 112 as it is manipulated by the operator 116. Any kind of computer device can be used as the computer 124, such as a personal computer or a server computer, to name just two examples.

One or more markers (such as objects with distinguishing shapes, colors, and/or light intensities, to name a few examples) can be placed on the handheld device 112 and/or on the operator 116 allowing tracking by an optical motion tracking system, for example. Optical motion tracking systems can use data captured from sensors such as cameras to triangulate the 3D position of a subject and to determine its movement. In some implementations, video information can be transmitted from the motion-detecting cameras to the computer 124 which can process video and can determine the movement and position of the device 112, primarily based on calculated movement and positions of the markers, for example. In some implementations, video information can be processed at least in part by systems at the motion-detecting cameras, and relevant movement and positional information can be transferred to the computer 124, for example. Here, for example, movement and positional information can be interpreted by the computer 124 to determine the movement and position of the device 112 and/or the operator 116.

In some implementations, markers placed on the device 112 and/or the operator 116 can be associated with other physical properties instead of or in addition to light, such as sound, magnetism, or electromagnetic radiation, to name a few examples, and the periphery of sensors 118a-d can be set up to detect one or more of these physical marker types. Here, for example, movement and positional information can be transferred by one or more of the physical sensors 118a-d via the connection 122 and can be interpreted by the computer 124 to determine the movement and position of the device 112 and/or the operator 116.

In some implementations, the computer 124 can communicate with the camera 102 and/or the automated crane 104 and/or the dolly 106, via one or more wired and/or wireless connection 126, for example. Here, the computer 124 can control the camera 102 and/or the crane 104 and/or the dolly 106 using inverse kinematics robot control techniques, for example.

In some implementations, the camera 102 can generate a live image of the scene 110 and can relay the image to the display device 114 associated with the handheld device 112 via the connection 126, the computer/transmitter 124, and a wireless connection 128, for example. Any wireless protocol can be used, such as the 802.11 series of protocols, for example. In some implementations, the live image can be relayed to the display device 114 from a transmitter connected to the camera 102, for example.

In some implementations, the wireless connection 128 can be used to transmit movement and positional information from the handheld device 112 to the computer/receiver 124. For example, in some implementations, one or more components of a system for determining the movement and/or position of the device 112, such as movement and/or position sensors, can be located on the device itself. For example, a plurality of markers positioned around the device 112 can be detected by sensors on the device 112 to determine its relative position and movement (as will be further exemplified in FIG. 2). In some implementations, a hybrid of tracking systems can be used to determine the position and movement of the handheld device 112 and/or the operator 116.

Figure 2:
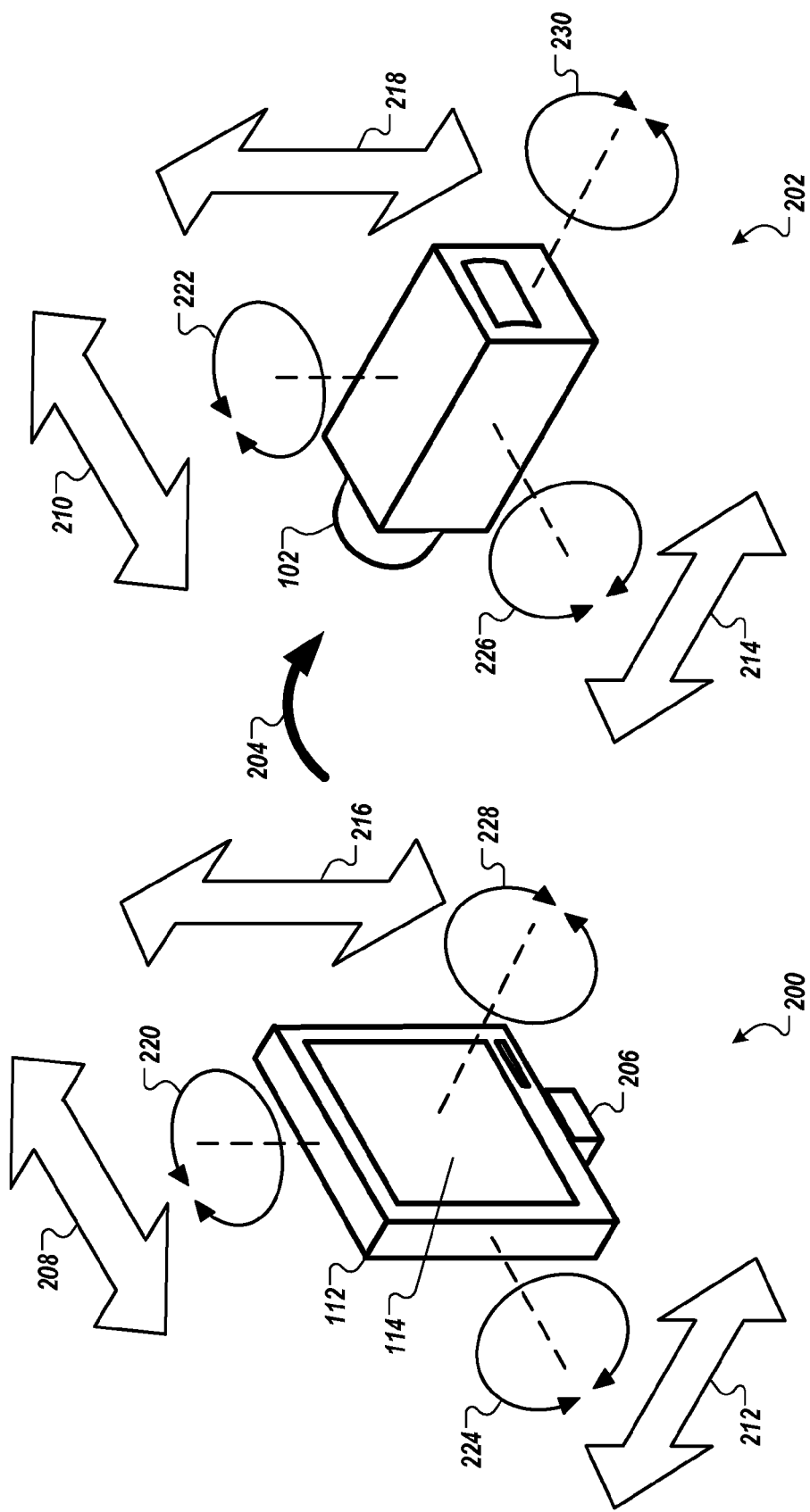
FIG. 2 shows examples of device movement that can be used to control robotic camera movement.

FIG. 2 is a diagram of an example of device maneuvers 200 that can be employed to control or otherwise cause robotic camera maneuvers 202. As schematically illustrated by a relational arrow 204, one or more of the device maneuvers 200 being performed can cause one or more of the camera maneuvers 202 to be executed, for example by robotic techniques as exemplified in the system 100.

In some implementations, the handheld device 112 can include one or more sensors 206. The sensor 206 can, for example, function as a position detector for determining the position and/or movement of the device 112. In some implementations, the sensor 206 can generate output that can be used to control the camera 102, for example by robotic techniques as exemplified in the system 100. In some implementations, the robotic motion causes the camera 102 to emulate the handheld device 112 while the live image from the camera 102 is presented on the display device 114.

The sensor 206 generating the output for controlling the robotic motion of the camera 102 can be any kind of sensor such as an inertia sensor, an optical sensor, an audio sensor, and/or a magnetic sensor, to name a few examples. In some implementations, markers or transmitters can be positioned around the device 112 to provide a set of reference points for the sensor 206, but these are not explicitly shown in the figure for clarity. Methods for determining the position and/or movement of the device 112 can use the sensor 206, sensing and tracking techniques using fixed sensors as exemplified in system 100, and hybrid systems combining multiple systems and techniques, to name a few examples. Output for controlling the camera 102 can be generated by any exemplary methods.

One or more robotic maneuvers can be applied to the camera 102 by maneuvering the device 112, for example. Here, from the point of view of one situated in front of the display device 114, for example, the device 112 can undergo a rightward or leftward movement 208. In the present example, the movement 208 can be detected (e.g., by the sensor 206) and an output can be generated that causes the camera 102 to undergo a rightward or leftward movement 210, which in some implementations is proportional to the movement 208. As another example, the device 112 can undergo a forward or backward movement 212 and the camera 102 can be caused to undergo a forward or backward movement 214. As another example, the device 112 can undergo an upward or downward movement 216 and the camera 102 can be caused to undergo a upward or downward movement 218.

As another example, rotational maneuvers such as panning (or yaw), tilting (or pitch) and/or rolling can be applied to the camera 102 by maneuvering the device 112, for example. Here, from the point of view of one situated in front of the display device 114, for example, the device 112 can undergo a panning maneuver 220. In the present example, the maneuver 220 can be detected (e.g., by the sensor 206) and an output can be generated that causes the camera 102 to undergo a panning maneuver 222, which in some implementations is proportional to the maneuver 220. As another example, the device 112 can undergo a tilting maneuver 224 and the camera 102 can be caused to undergo a tilting maneuver 226. As another example, the device 112 can undergo a rolling maneuver 228 and the camera 102 can be caused to undergo a rolling maneuver 230.

Two or more of the maneuvers previously described can be performed concurrently in any of various combinations. For example, the device 112 can undergo a tilting maneuver 224 while undergoing an upward motion 216. In the present example, the combination of maneuvers can be detected (e.g., by the sensor 206) that can generate output that can cause the camera 102 to undergo a corresponding tilting maneuver 226 while undergoing a corresponding upward motion 218. In some implementations, any combination of movements can be performed by the device 112 and applied to the camera 102.

In some implementations, certain maneuvers can be restricted. For example, it may be determined that the camera rolling maneuver 230 is undesirable. In the present example, the device rolling maneuver 228 can be ignored (e.g., by the sensor 206) or by systems receiving generated output (e.g., by the sensor 206). In the present example, if the device 112 were to undergo a rolling maneuver 228 and a simultaneous backward motion 212, the camera can be caused to undergo a corresponding backward motion 214 but not a rolling maneuver 230.

In some implementations, movement of the device 112 can be determined based on location information (as determined by the sensor 206 and/or other methods exemplified in the system 100) and corresponding movement of the camera 102 can be scaled according to at least one predefined parameter. For example, a parameter can be defined to specify that forward movement of the camera 102 can be ten times greater (or smaller) than the controlling forward movement of the device 112. In the present example, a forward movement 212 of the device 112 often centimeters can translate to a corresponding forward movement 214 of the camera 102 of one meter (or one centimeter). Different, similar or identical scaling parameters can be specified for each of the device maneuvers 200 and the corresponding camera maneuvers 202, for example. Scaling parameters can apply to the position and/or the acceleration of the robotic camera 102 and the controlling device 112, for example.

Figure 3:
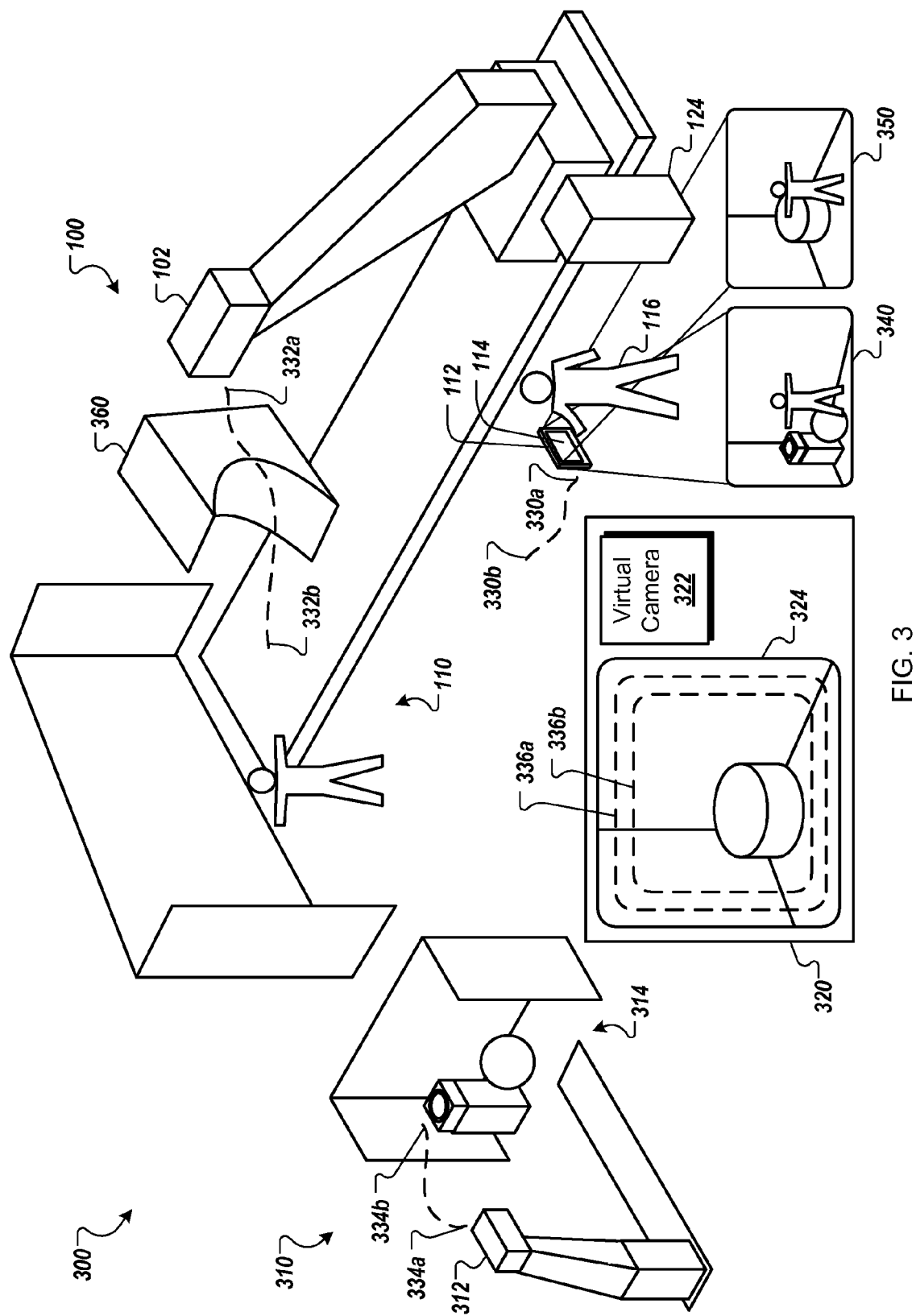
FIG. 3 shows an example system that can provide remote control to robotic and/or virtual cameras.

FIG. 3 is a diagram of an example of a system 300. In some implementations, the system 100 can provide remote control to one or more robotic and/or virtual cameras, for creating composite images, and for recording and refining camera movement, to name a few possibilities. The system 300 can include a plurality of real and/or virtual systems, such as the system 100, a secondary system 310, and/or a virtual system 320, for example. In examples below, it will be shown that one or more of the systems can be controlled (e.g. by an operator or a computer) individually or two or more systems can be controlled simultaneously. As another example, it will be discussed that images generated by multiple systems can be used for creating composite images, and/or that robotic or virtual camera operation can be recorded, recalled, and enhanced.

Here, for example, the primary system 100 can include the primary robotic camera 102 positioned in relation to the primary scene 110. In some implementations, the operator 116 can control the primary camera 102 using the handheld device 112 by methods, for example as previously described.

In some implementations, the secondary system 310 can include a secondary robotic camera 312 supported by robotic systems similar to systems supporting the primary robotic camera 102, for example. Here, the secondary camera 312 can be positioned in relation to a secondary scene 314, for example. In some implementations, the secondary camera 312 can be a miniature camera, such as a lipstick camera, for example, and the secondary scene 314 can be a miniature scene. In some implementations, the secondary camera 312 and scene 310 can be the same size or larger than the primary camera 102 and scene 110.

In some implementations, the virtual system 320 can include a virtual camera 322 and a virtual scene 324. The virtual system 320 can include computer components for performing its functions, such as a processor, and a memory and/or a hard drive for storing information such as software. The virtual scene 324 can include a computer-based 3D model such as a solid or shell model, for example. The scene 324 can be generated by any method such as using a dedicated modeling program or a model description language, to name a couple of examples. The virtual camera 322 can represent a viewpoint regarding the virtual scene 324, and can be designed to operate in virtual space analogously to how a physical camera would in real space, for example.

In some implementations, the primary camera 102 in the primary system 100, and/or the secondary camera 312 in the secondary system 310, and/or the virtual camera 322 in the virtual system 320 can be controlled simultaneously. For example, the operator 116 can cause the handheld device 112 to move on a path 330a-b. In the present example, in response to the motion of the device 112, the primary camera 102 can be caused to move on a path 332a-b, for example by robotic control methods as previously described. In some implementations, the secondary camera 312 can be caused to move, in response to the motion of the device 112, on a path 334a-b, for example by similar robotic control methods. In some implementations, the virtual camera 322 can be caused to virtually move, in response to the motion of the device 112, on a path that corresponds to zoom positions 336a-b with regard to the virtual scene, for example as schematically illustrated in the drawing. In some implementations, the control of the virtual camera can be performed using methods that can be employed by a computer graphics engine. Here, for example, one or more of the cameras 102, 312, and 322 can simultaneously travel along their respective paths 332a-b, 334a-b, and assume the zoom levels 336a-b. Any or all of the paths can be modified compared to the path 330, for example by translation or scaling.

In some implementations, the operator 116 can be in visual communication with any or all of the scenes, such as the primary scene 110 as viewed by the primary camera 102, the secondary scene 314 as viewed by the secondary camera 312, and/or the virtual scene 324 as viewed by the virtual camera 322. For example, visual feedback can be presented on the display device 114 included in the handheld device 112. Visual feedback can include at least portions of images from one or more of the cameras 102, 312, and/or 322, allowing the operator 116 to control any of the cameras individually, or allowing the operator 116 to control one or more of the cameras simultaneously, for example.

In some implementations, the output that controls the robotic motion of the primary camera 102 can also control the second camera 312. Here, for example, the primary camera 102 can be associated with the primary scene or set 110 and can generate a live image from the primary set 110 at the camera position 332a. In the present example, the secondary camera 312 can be associated with the secondary scene or set 314 and can be configured to generate a live image from the secondary set 314 at the camera position 334a. Both the primary camera 102 and the secondary camera 312 can be placed in other locations based on location information, for example. In some implementations, location information can be provided by the handheld device 112 and/or a computer model (as can be provided by the computer 124, for example). Here, while the primary camera 102 is moved from position 332a to position 332b and while the secondary camera 312 is moved from position 334a to position 334b, at least portions of live images from both the camera 102 and the camera 312 can be presented, for example at the display device 114 as shown by a composite image 340.

In some implementations, the output that controls the robotic motion of the primary camera 102 can also control the virtual camera 322. For example, the primary camera 102 and the primary scene or set 110 can operate in parallel with the virtual camera 322 and the virtual scene or set 324. Here, the virtual camera 322 and the virtual set 324 can be generated by a computer, such as a computer device associated with the virtual system 320, for example. In the present example, the virtual camera 322 can be associated with the virtual set 324 and can be configured to generate an image from the virtual set 324 at the camera position 336a. Both the primary camera 102 and the virtual camera 322 can be placed in other locations based on location information provided by methods such as the exemplary methods, for example. Here, while the primary camera 102 is moved from position 332*a* to position 332*b* and while the virtual camera is moved from position 336*a* to position 336*b* (here, a forward motion), at least portions of live images from both the camera 102 and the virtual camera 322 can be presented, for example at the display device 114 as shown by a composite image 350.

The system 300 can be used for controlling, recording, recalling, and/or refining camera movement, to name a few possibilities. Here, for example, in the system 100, the initial camera location 332*a* can be identified for the camera 102 and the camera can be placed at the location 332*a*. The path from location 332*a* to location 332*b* can be calculated for the camera 102 and the camera 102 can traverse the path 332*a-b* by robotic motion, for example. In some implementations, path and/or location information can be provided via the handheld device 112. For example, the handheld device can register one or more key locations, such as the initial device location 330*a*, the final device location 330*b*, and any other desired key locations along the path 330*a*-330*b*. In the present example, the system 100 can calculate the analogous camera path 332*a*-332*b*, including the corresponding initial camera location 332*a*, the final camera location 332*b*, and any other key locations, considering such factors as scaled movement and acceleration, for example. Here, the path 332*a-b* of the camera 102 can be determined by a calculation, as can be performed by the computer 124, for example.

In some implementations, the system 300 can be configured to identify and avoid camera obstructions. For example, the system 100 can include an obstruction 360 in relation to the set 110. Here, one or more obstructions, such as the obstruction 360, for example, can be identified between the initial camera location 332*a* and the final camera location 332*b*. The system 100 can take the obstruction 360 into account in calculating the path 332*a-b* so that the obstruction 360 does not interfere with the camera 102. In some implementations, the obstruction 360 can be identified as part of a model of the set 110. The model can be a virtual or a real model that can be identified by the system 100 and referenced by the processing computer 124, for example. In some implementations, any or all of the systems 100, 310, and 320 can cause their respective cameras 102, 312, and 322 to undergo movement to avoid one or more obstructions associated with the system controlling the camera, or associated with a model of the system, for example. In the present example, one or more systems not directly associated with an obstruction can cause a camera associated with the system to undergo a movement analogous to a movement taken by a camera to avoid an obstruction. Here, for example, the camera 102 in the system 100 can move on the path 332*a-b* to avoid the obstruction 360. Here, the camera 312 in the system 310 can move on the analogous path 334*a-b*, whether or not an obstruction analogous to the obstruction 360 exists in the system 310, for example.

In some implementations, camera movement can be determined by predefined sequences, for example. Sequences can be a stored set of camera operations, such as camera movement and other camera settings such as focus, aperture, shutter speed, and zoom, to name a few examples. In some implementations, sequences can be defined with the use robotic control software and/or virtual systems, and stored and performed by the computer 124 in the system 100, for example. In some implementations, sequences can be recorded while being performed in real-time, for example as performed by the operator 116 using the handheld device 112.

In some implementations, the operator 106 can move the handheld device 112 to specify a predefined movement. In the present example, output can be generated by the device 112 and registered, for example by the computer 124. Here, path information can be recorded based on the registered output before the camera 102 undergoes the predefined movement. In some implementations, the camera 102 can undergo the movement while recording.

Stored and/or recorded sequences can be modified and refined by the system 300. For example, the camera 102 can be caused to undergo a predefined movement based on path information, such as movement along the path 332*a-b*. Here, an aspect of the predefined movement can be identified for modification using the handheld device 112. For example, the tilting capability of the robotic camera 102 can be controlled by the operator 116 using the device 112 while the camera moves along the path 332*a-b*. In the present example, one or more parameters associated with one or more aspects of camera movement and/or camera settings can be modified using location information based on the device 112 and/or the operator 116. In some implementations, the modified parameter(s) can be recorded in association with the path information such that the modified parameter is taken into account in subsequent use of the path information. Here, for example, the modified tilting aspect can be stored with the predefined path information and the camera 102 can be caused to undergo a combined set of operations at a subsequent time. By the exemplary methods, camera operation instructions can be defined, refined, and stored for subsequent use.

Figure 4:
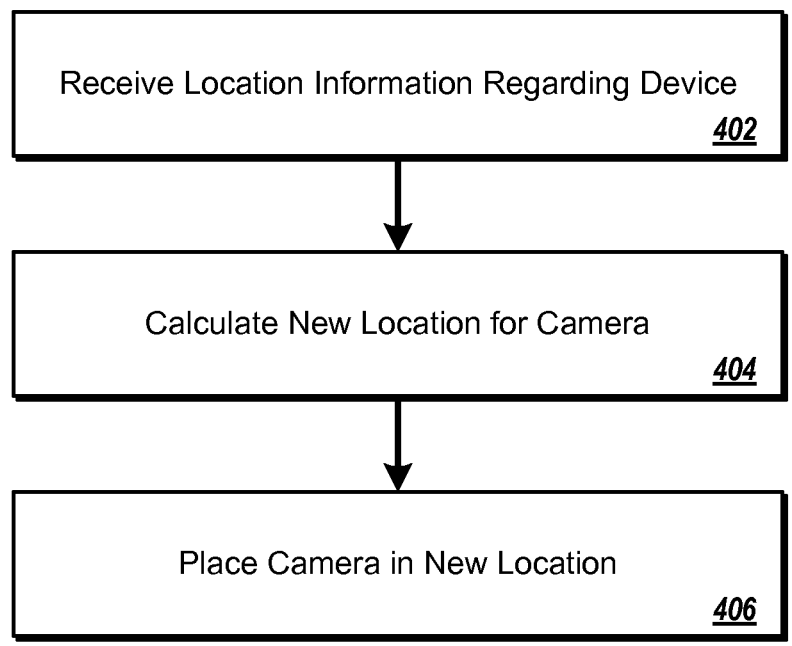
FIG. 4 shows an example of a process for placing a camera in a location.

FIG. 4 shows an example of a process 400 for controlling a camera. The camera can be a robotic camera or a virtual camera, to name a couple of examples. In some implementations, the process 400 can be performed in the system 100, the system 310, and/or the virtual system 320, for example by a processor executing instructions from a computer readable storage device. More or fewer steps can be performed; as another example, one or more steps can be performed in another order.

The process 400 can include a step 402 for receiving location information regarding a device (such as the handheld device 112, for example) carried by an operator (such as the operator 116, for example). In some implementations, the device can include a display device (such as the display device 114, for example) for continuously presenting a live image from a camera (such as the camera 102 or the camera 312, for example) configured for being placed in a plurality of locations by robotic motion. In some implementations, the device can include a display device for continuously presenting an image from a virtual camera (such as the virtual camera 322, for example) configured for movement through virtual space by a computer processor, for example.

The process 400 can include a step 404 to calculate a new location for the camera. In some implementations, the new location can be calculated using location information regarding the device, such as the location information received in step 402, for example. In some implementations, scaling methods such as the described exemplary methods can be used in the location calculations. The location calculations can be performed by a computer processor (such as a processor associated with the computer 124, for example).

The process 400 can include a step 406 to place the camera in a new location. For example, the new location can be determined by a method such performing the calculations in step 404. A robotic camera can be placed in the new location by robotic motion, for example. In the present example, while the camera moves, a live image from the robotic camera can be presented on the display device. As another example, a virtual camera can be moved through virtual space by instructions that can be executed on a computer processor, for example. In the present example, while the camera moves, a computer-generated image from the virtual camera can be presented on the display device.

Figure 5:
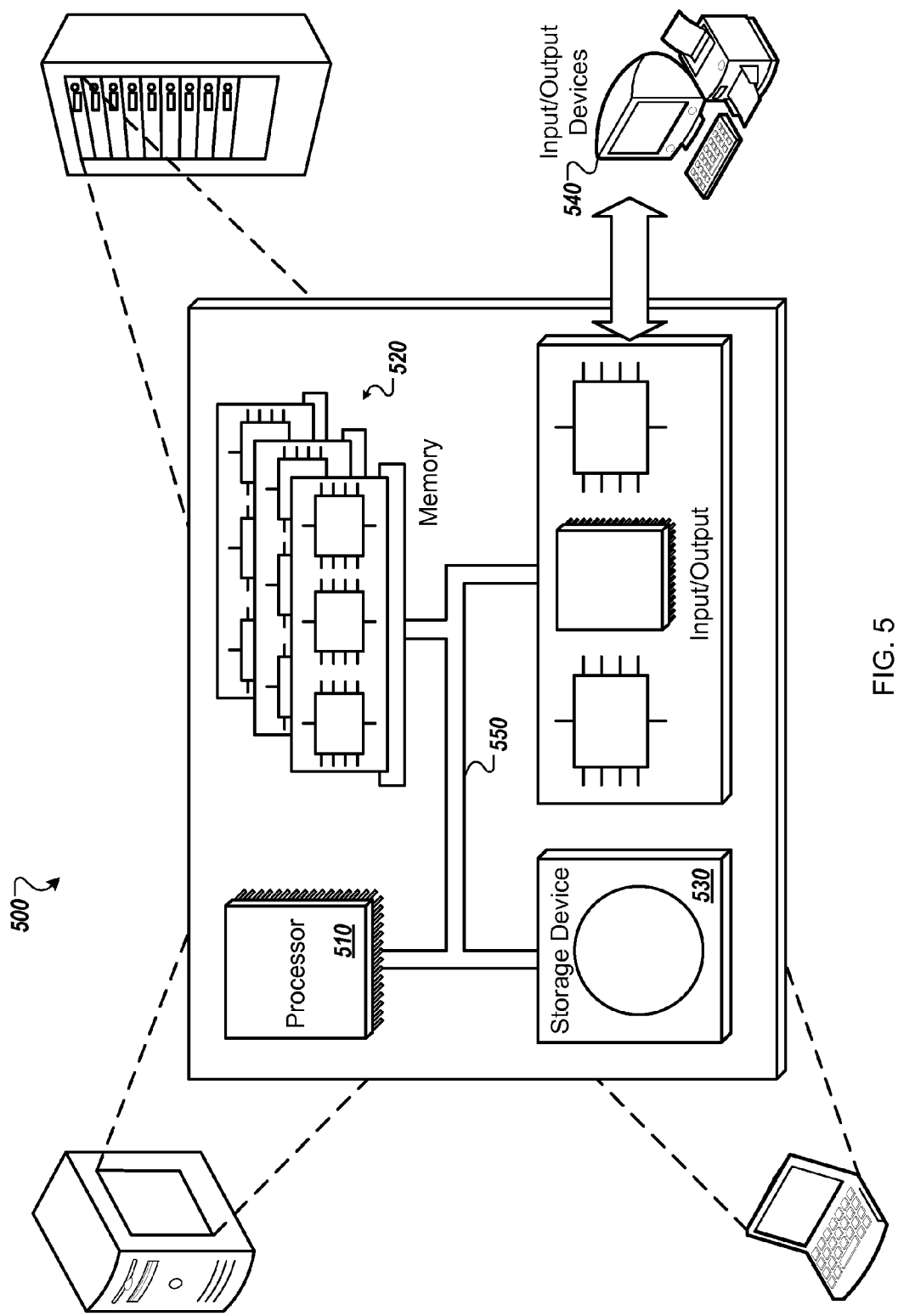
FIG. 5 is a block diagram of a computing system that can be used in connection with computer-implemented methods described in this document.

FIG. 5 is a schematic diagram of a generic computer system 500. The system 500 can be used for the operations described in association with any of the computer-implement methods described previously, according to one implementation. The system 500 includes a processor 510, a memory 520, a storage device 530, and an input/output device 540. Each of the components 510, 520, 530, and 540 are interconnected using a system bus 550. The processor 510 is capable of processing instructions for execution within the system 500. In one implementation, the processor 510 is a single-threaded processor. In another implementation, the processor 510 is a multi-threaded processor. The processor 510 is capable of processing instructions stored in the memory 520 or on the storage device 530 to display graphical information for a user interface on the input/output device 540.

The memory 520 stores information within the system 500. In one implementation, the memory 520 is a computer-readable medium. In one implementation, the memory 520 is a volatile memory unit. In another implementation, the memory 520 is a non-volatile memory unit.

The storage device 530 is capable of providing mass storage for the system 500. In one implementation, the storage device 530 is a computer-readable medium. In various different implementations, the storage device 530 may be a floppy disk device, a hard disk device, an optical disk device, or a tape device.

The input/output device 540 provides input/output operations for the system 500. In one implementation, the input/output device 540 includes a keyboard and/or pointing device. In another implementation, the input/output device 540 includes a display unit for displaying graphical user interfaces.

The features described can be implemented in digital electronic circuitry, or in computer hardware, firmware, software, or in combinations of them. The apparatus can be implemented in a computer program product tangibly embodied in an information carrier, e.g., in a machine-readable storage device or in a propagated signal, for execution by a programmable processor; and method steps can be performed by a programmable processor executing a program of instructions to perform functions of the described implementations by operating on input data and generating output. The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. The essential elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor for displaying information to the user and a keyboard and a pointing device such as a mouse or a trackball by which the user can provide input to the computer.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, e.g., a LAN, a WAN, and the computers and networks forming the Internet.

The computer system can include clients and servers. A client and server are generally remote from each other and typically interact through a network, such as the described one. The relationship of client and server arises by virtue of computer programs running on the respective computers and having a client-server relationship to each other.

A number of embodiments have been described. Nevertheless, it will be understood that various modifications may be made without departing from the spirit and scope of this disclosure. Accordingly, other embodiments are within the scope of the following claims.

What is claimed is:

1. A system for recording a motion picture performance comprising:
   a movie making set in which one or more performers act out a scene for a motion picture;
   a camera generating a live image of at least one of the performers while the performers act out the scene, the camera including a robotic movement device configured to move the camera;
   a tablet device that is held and moved within a capture area by a user while the performers act out the scene, the tablet device including a display device for continuously presenting the live image;
   a sensor that generates tracking data that represents the movements of the tablet device within the capture area; and
   a controller that is communicably coupled to the camera, the tablet device and the sensor, and that:
      converts the tracking data to movement commands by increasing a scale of the movements of the tablet device;
      applies the movement commands to a virtual camera in a virtual set such that the virtual camera moves within the virtual set in real time according to the movements of the tablet by the user; and applies the movement commands to the robotic movement device such that the camera moves in real time according to the movements of the tablet by the user, wherein the tablet device provides the user a real time view of at least portions of live images from both the camera and virtual camera combined together.

2. The system of claim 1, wherein the tablet device has a generally flat configuration with the display device located on a main face of the tablet device.

3. The system of claim 1, wherein the sensor includes an inertia sensor included in the tablet device.

4. The system of claim 1, wherein the sensor includes an optical sensor included in the tablet device.

5. The system of claim 1, wherein the sensor includes a magnetic sensor included in the tablet device.

6. The system of claim 1, wherein the sensor includes a plurality of sensors mounted in a fixed arrangement around the capture area, the sensors generating the tracking data by registering the movement of the handheld device.

7. The system of claim 1, wherein the robotic movement device includes a crane.

8. The system of claim 1, further comprising:
another movie making set in which one or more other performers act out the scene for the motion picture; and
another camera generating another live image of at least one of the other performers while the other performers act out the scene, the other camera including another robotic movement device configured to move the other camera;
wherein the controller applies the movement commands also to the other camera such that the other camera moves in real time according to the movements of the tablet by the motion picture director, wherein the tablet device provides the motion picture director a real time view of what the scene looks like when captured by the camera and when captured by the other camera.

9. The system of claim 1, wherein the controller, before applying the movement commands to the robotic movement device:
identifies an obstruction that would interfere with the camera if the movement commands were applied to the robotic movement device;
takes the obstruction into account in converting the tracking data to the movement commands so that the obstruction does not interfere with the camera.

10. The system of claim 1, wherein the controller converts the tracking data to the movement data in part by scaling the tracking data by a predefined parameter.

11. The system of claim 1, wherein the camera generates a video recording of the live image.

12. A method of recording a video sequence comprising:
generating a live image of at least one or more performers acting out a scene on a set with a camera;
controlling the camera, with a controller that is communicably coupled to the camera, a tablet device and a sensor, while the performers act out the scene by:
receiving, from the sensor, tracking data that represents the movements of the tablet device held by a user and moveable within a capture area;
converting the tracking data to movement commands by increasing a scale of the movements of the tablet device;
applying the movement commands to a virtual camera in a virtual set such that the virtual camera moves within the virtual set in real time according to the movements of the tablet by the user; and
applying the movement commands to a robotic movement device that controls the camera such that the camera moves in real time according to the movements of the tablet by the user, wherein the tablet device provides the user a real time view of at least portions of live images from both the camera and virtual camera combined together on a display of the table device.

13. The method of claim 12 wherein the tablet device has a generally flat configuration with the display device located on a main face of the tablet device.

14. The method of claim 12 wherein the sensor includes an inertia sensor included in the tablet device.

15. The method of claim 12 wherein the sensor includes an optical sensor included in the tablet device.

16. The method of claim 12 wherein the sensor includes a plurality of sensors mounted in a fixed arrangement around the capture area, the sensors generating the tracking data by registering the movement of the handheld device.

17. The method of claim 12 wherein the controller converts the tracking data to the movement data in part by scaling the tracking data by a predefined parameter.

18. The method of claim 12 wherein the controller, before applying the movement commands to the robotic movement device identifies an obstruction that would interfere with the camera if the movement commands were applied to the robotic movement device, and takes the obstruction into account in converting the tracking data to the movement commands so that the obstruction does not interfere with the camera.

19. A non-transitory computer readable memory having a plurality of instructions stored thereon that, when executed by a processor, carry out a method of controlling a camera that generates a live image of at least one or more performers acting out a scene on a set with a tablet device held by a user and moveable within a capture area while the performers act out the scene, the method comprising:
receiving, from a sensor, tracking data that represents the movements of a tablet device held by a user and moveable within a capture area;
converting the tracking data to movement commands by increasing a scale of the movements of the tablet device;
applying the movement commands to a virtual camera in a virtual set such that the virtual camera moves within the virtual set in real time according to the movements of the tablet by the user; and
applying the movement commands to a robotic movement device that controls the camera such that the camera moves in real time according to the movements of the tablet by the user, wherein the tablet device provides the user a real time view of at least portions of live images from both the camera and virtual camera combined together on a display of the table device.

20. The non-transitory computer readable memory of claim 19 wherein the tablet device has a generally flat configuration with the display device located on a main face of the tablet device.

21. The non-transitory computer readable memory of claim 19 wherein the sensor includes an inertia sensor included in the tablet device.

22. The non-transitory computer readable memory of claim 19 wherein the sensor includes an optical sensor included in the tablet device.

23. The non-transitory computer readable memory of claim 19 wherein the sensor includes a plurality of sensors mounted in a fixed arrangement around the capture area, the sensors generating the tracking data by registering the movement of the handheld device.

24. The non-transitory computer readable memory of claim 19 wherein the controller converts the tracking data to the movement data in part by scaling the tracking data by a predefined parameter.

25. The non-transitory computer readable memory of claim 19 wherein the method includes, before applying the movement commands to the robotic movement device, identifying an obstruction that would interfere with the camera if the movement commands were applied to the robotic movement device, and taking the obstruction into account in converting the tracking data to the movement commands so that the obstruction does not interfere with the camera.

* * * * *

UNITED STATES PATENT AND TRADEMARK OFFICE
CERTIFICATE OF CORRECTION

| | | |
|---|---|---|
| PATENT NO. | : 8,698,898 B2 | Page 1 of 1 |
| APPLICATION NO. | : 12/333169 | |
| DATED | : April 15, 2014 | |
| INVENTOR(S) | : Domenico Porcino | |

It is certified that error appears in the above-identified patent and that said Letters Patent is hereby corrected as shown below:

In the Claims

Claim 12
Column 14, line 8
    Remove "table" and insert --tablet--

Claim 19
Column 14, line 55
    Remove "table" and insert --tablet--

Signed and Sealed this
Eighth Day of July, 2014

Michelle K. Lee
*Deputy Director of the United States Patent and Trademark Office*